United States Patent [19]

Shiota et al.

[11] Patent Number: 4,726,675
[45] Date of Patent: Feb. 23, 1988

[54] COLOR PICTURE REPRODUCTION USING BALANCED PHOSPHORS

[75] Inventors: Kazuo Shiota; Toru Shinada; Hitoshi Urabe, all of Kanagawa, Japan

[73] Assignee: Fuji Photo Film Co., Ltd., Kanagawa, Japan

[21] Appl. No.: 883,397

[22] Filed: Jul. 8, 1986

[30] Foreign Application Priority Data

Jul. 8, 1985 [JP] Japan .................... 60-148193

[51] Int. Cl.$^4$ ............... G03B 29/00; G01D 9/42; H01J 29/20; C09K 11/77
[52] U.S. Cl. ................. 354/75; 346/110 R; 313/468; 252/301.4 P
[58] Field of Search ............. 354/75, 76; 346/110 R; 369/108; 358/302, 331–334; 313/467–469; 252/301.4 R, 301.4 P

[56] References Cited

U.S. PATENT DOCUMENTS 3,723,787  3/1973  Blasse et al. .................. 313/468
3,922,233  11/1975  Torii et al. ............... 252/301.4 R X Primary Examiner—W. B. Perkey
Attorney, Agent, or Firm—Sughrue, Mion, Zinn, Macpeak & Seas

[57] ABSTRACT

Color picture reproduction in which a monochromatic CRT having emissions in the blue, green and red regions successively displays blue, green and red picture signals. The separate color displays are filtered by blue, green and red filters before being imaged on a color print material. The phosphors of the CRT are selected to reduce the blue emissions below the green and red emissions.

8 Claims, 6 Drawing Figures

COLOR PICTURE REPRODUCTION USING BALANCED PHOSPHORS

BACKGROUND OF THE INVENTION

1. Related Application

This application is related to Japanese Patent Application No. 148,192/85, upon which is based on U.S. patent application Ser. No. 883,401, filed July 8, 1986.

2. Field of the Invention

The present invention relates to a color picture reproducing method. More particularly, the invention relates to a color picture reproducing method in which a color photosensitive material is successively exposed to light form tricolor-decomposed pictures displayed on a high-luminance monochromatic cathode-ray tube (CRT) for one scene.

3. Background Art

It has been recent practice to record pictures on magnetic recording media such as a magnetic disk by using electronic cameras (for still pictures). Alternatively, pictures are photographed once on color photographic films by using ordinary cameras, and are then recorded on magnetic recording media such as a magnetic disk, so that the pictures recorded on the magnetic media can be reproduced or displayed on CRTs for viewing. With the advance of such recording techniques, it has been suggested that color pictures recorded on magnetic disks be printed onto color photosensitive materials as color prints to be handed to customers.

As one conventional method for reproducing such color prints, that is, color pictures, a method shown in FIG. 1 has been used in practice.

As shown in the drawing, the conventional method is carried out such that a high-luminance monochromatic CRT 1, whose monochromatic output nontheless has luminance in the blue (B), the green (G) and the red (R) regions, is caused to emit light successively on the basis of its blue, green and red picture signals obtained by decomposing a picture into its three color components. A color photosensitive material 4 is exposed successively to the emitted light on the basis of the respective blue, green and red picture signals for each scene through a lens system 2 and respective blue, green and red filters 3 (the blue, green and red filters are each successively used for the exposure for the pictures corresponding to the blue, green and red pictures signal), and then the color photosensitive material 4 is developed to obtain a color print. In the above-mentioned printing method, however, it is impossible to avoid color mixing owing to the fact that not only a blue (B) photosensitive layer but a green (G) photosensitive layer and/or a red (R) photosensitive layer are sensitized in the blue exposure for the blue (B) photosensitive layer. This results in a problem of reduction in saturation, particularly in the blue area.

Although it is desirable that the above-mentioned printing method is carried out in as short time as possible, balance in the sensitivity of the color photosensitive material does not match the output of an ordinary monochromatic CRT. Accordingly, to obtain a color picture with good color balance, the exposure times required for the successive exposures of a scene for different color components must be changed from each other. Particularly, the exposure time for a blue picture must be significantly shorter than the exposure time for a red picture. As a result, handling of exposure becomes complex, and this complexity becomes an important factor that inhibits speeding up of the whole printing process.

SUMMARY OF THE INVENTION

An object of the present invention is, therefore, a method of reproducing a color picture including the steps of causing a monochromatic CRT to emit light including blue, green and red components on the basis of separate and successively applied blue, green and red signals for each scene to thus successively obtain a blue picture, a green picture, and a red picture, and of exposing a color photosensitive material successively to blue, green and red signal pictures through respective blue, green and red filters without color mixing.

A further object of the invention is to perform such color printing with equal exposure times for the three color components.

According to the invention, a fluorescent substance used in the CRT used has such a luminance distribution characteristic that a peak in the blue luminance region of B is lowered.

DETAILED DESCRIPTION OF THE PREFERRED EMBODIMENTS

The present invention will be described more in detail with reference to the drawings.

Figure 1:
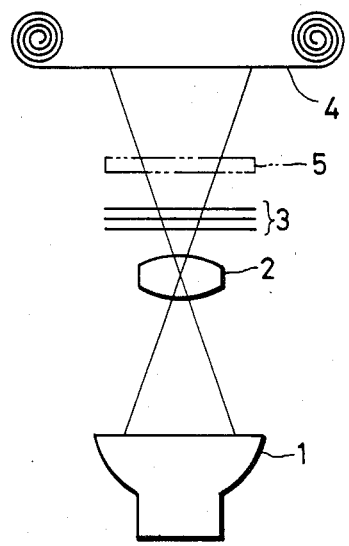
FIG. 1 is a view to help explain a method in which a color print is exposed to light of blue, green and red pictures successively emitted from a CRT scene by scene.

In FIG. 1, picture signals of the separated blue, green and red components of a scene are displayed on a high-luminance CRT 1 for exposure. The CRT 1 has luminance in the blue, green and red regions, these picture signals are, for example, transmitted from a magnetic disk (floppy disk), or the like, on which are recorded separate blue, green and red pictures of the same color scene. For example, the CRT 1 is caused to successively emit light for each scene in such an order that, after the completion of a necessary amount of exposure with blue light, exposure to green light and exposure to red light are successively made. A color photosensitive material 4 is exposed to each of the three colored pictures of light emitted from the CRT 1 through a lens 2 and a selectively engaged filter 3. The exposure can be made on an equisized scale, an enlarged scale or a reduced scale.

Figure 2:
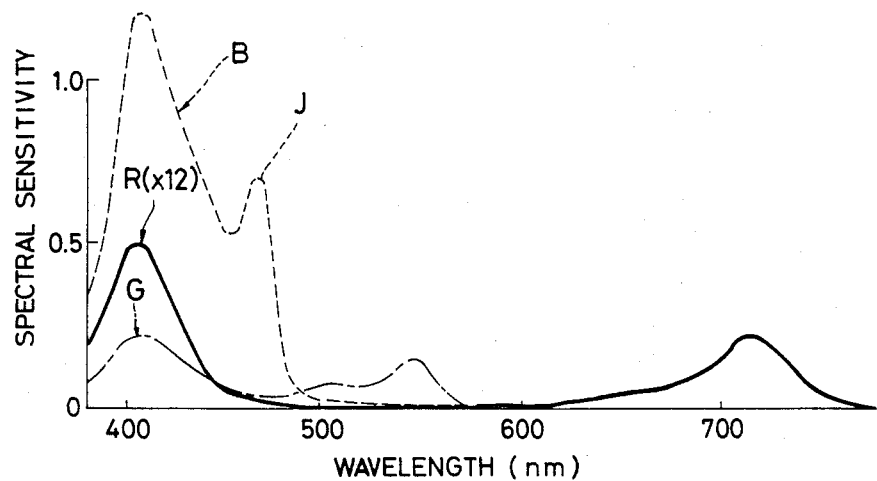
FIGS. 2 and 3 are graphs showing the spectral sensitivity characteristics of the color, light-sensitive paper.
Figure 3:
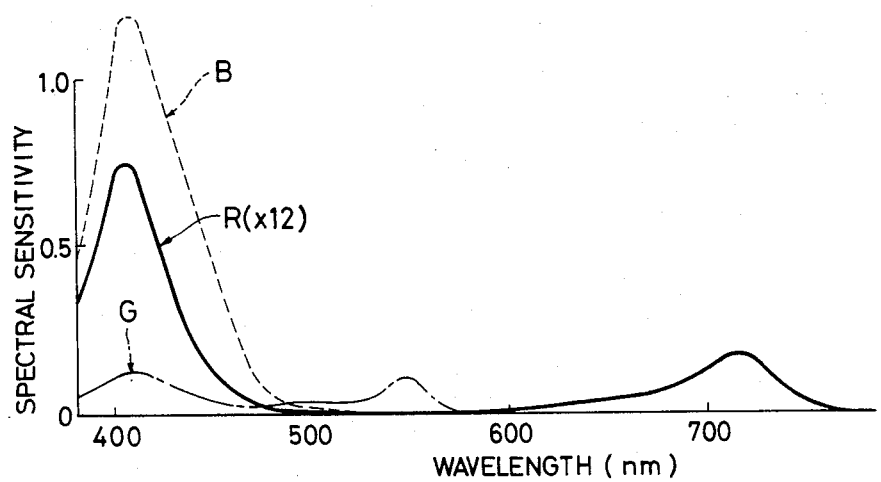

FIGS. 2 and 3 show the spectral sensitivity of color photo-sensitive materials (color paper) used in the present invention, respectively. (In the drawings, the spectral sensitivity R in the red is shown with the sensitivity enlarged 12 times for the clearness of the drawings.) Each color photosensitive material has such spectral sensitivity that its blue (B) photosensitive layer has greatest sensitivity in the blue wavelength region (ranging from about 360 nm to about 480 nm) of the CRT, its green (G) photosensitive layer thereof has significant sensitivity in the green wavelength region (ranging from about 460 nm to about 555 nm) of the CRT, and its red (R) photosensitive layer has some sensitivity in the secondary peak area (ranging from about 700 nm to about 710 nm) of the red wavelength region of the CRT. However, each of the blue, green and red photosensitive layers has a peak of spectral sensitivity at about 410 nm on the basis of intrinsic sensitivity of the silver halide.

Figure 4:
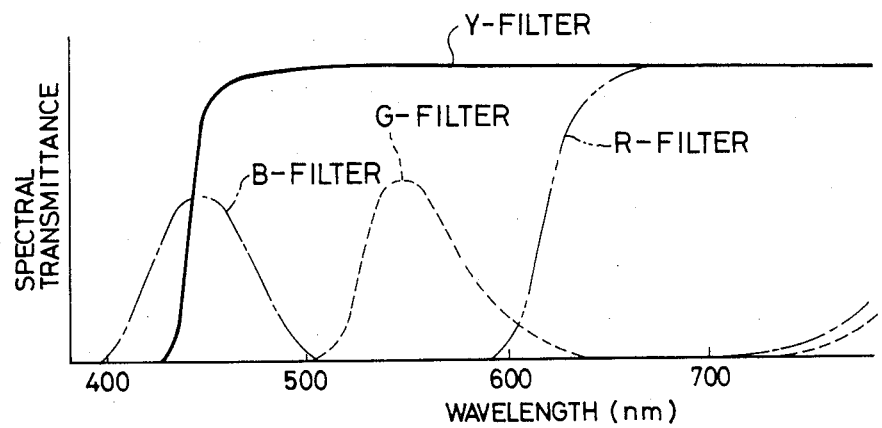
FIG. 4 is a graph showing the characteristics of transmittance of filters used for the successive tricolor exposures.
Figure 5:
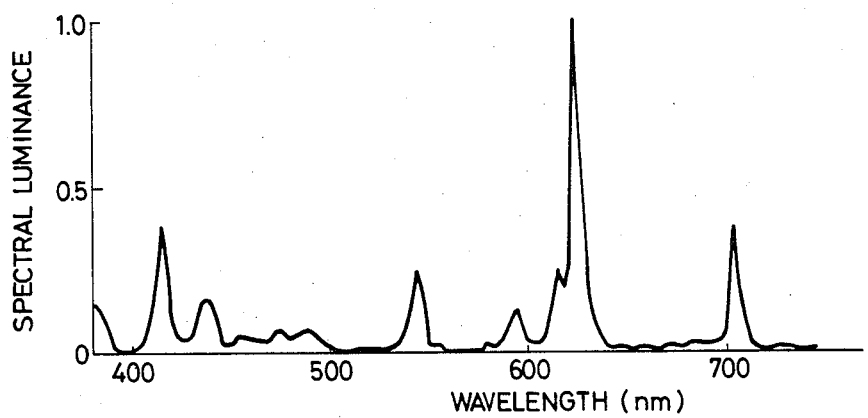
FIGS. 5 and 6 are graphs showing the luminance distribution characteristics of fluorescent substances used in the prior art and in the present invention, respectively.

On the other hand, a blue filter for transmitting only light in the blue wavelength region is used for the exposure of a blue picture. A green filter for transmitting only light in the green wavelength region is used for the exposure of a green picture. And a red filter for transmitting only light in the red wavelength region (including the infrared area) is used for the exposure of a red picture. The blue, green and red filters B, G and R used as the filters 3 for the purpose described above have the spectral characteristics shown in FIG. 4. Furthermore, in the case of a blue exposure, a yellow filter 5 (FIG. 1) having a spectral transmittance characteristic as shown in FIG. 4 is inserted in the light path to prevent color mixing caused by the fact that the green (G) photosensitive layer and the red (R) photosensitive layer of the color photosensitive material have spectral sensitivity on the basis of intrinsic sensitivity of silver halide. Accordingly, in this case, exposure is made in a wavelength region free from any wavelength peak in the intrinsic sensitivity of the silver halide.

It is necessary to use a fluorescent substance having luminance over all the regions of sensitivity of the decomposed tricolor components of the color photosensitive material. As such, a fluorescent substance that is used is a mixture of fluorescent materials named as P-45 and P-22. The fluorescent material P-45 has a luminance distribution in a wavelength region shorter than about 600 nm, while P-22 has a luminance distribution in a wavelength region longer than about 600 nm.

As an experiment, the color photosensitive material having the spectral response shown in FIG. 2 was exposed to light having the spectral intensity shown in FIG. 3 by utilizing an equivalent weight mixture of P-45 and P-22. A projector CRT was used as the CRT, and supplied with a high-voltage of 29 kV and a beam current of 200 $\mu$A. Filters whose spectral transmittances are shown in FIG. 4 were used. As the result, balanced sensitivity was shown at the measured exposure times of 2 sec. for red, 0.7 sec. for green and 0.5 sec. for blue.

Figure 6:
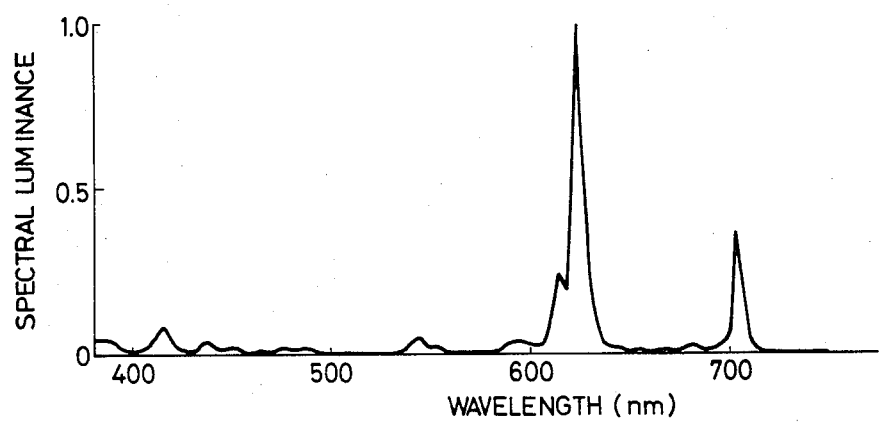

In another experiment, a fluorescent mixture of P-45 and P-22 in the weight proportion 1:4 was used under the same conditions as described above. This mixture of P-45 and P-22 produced a spectral intensity shown in FIG. 6. Balanced sensitivity was shown at the measured exposure times of 1 sec. for red, 1 sec. for green and 1 sec. for blue. That is, sensitivity balance was obtained with equal exposure times for the respective colors.

The fluorescent material having a main luminance distribution in the wavelength region shorter than about 600 nm which is used in the present invention may be, for example, a fluorescent material named P-45. This fluorescent material P-45 is used in a monochromatic high current density display and is composed of (Y.G-d)$O_2$S:Tb. P-45 emits a white luminous color. The other fluorescent material used in this invention has a main luminance distribution in a wavelength area longer than about 600 nm. This longer wavelength fluorescent material may be, for example, a fluorescent material named P-22 which is used in color television sets and is composed of $Y_2O_3$:Eu or $Y_2O_2S$:Eu, and emits a red luminous color.

When the mixture proportion of the fluorescent material P-45 to the fluorescent material P-22 is established within a range of from 1:3 to 1:5, the peak of in the blue luminance region can be lowered to thereby correspondingly raise the peak of in the red luminance area. Thus, it is possible to make the luminance of the CRT match the sensitivity balance of the color photosensitive material.

According to the present invention, in the case where a color print is obtained through tricolor successive scene-by-scene exposure by the use of a monochromatic CRT, it is possible to obtain a color print excellent in sensitivity balance as well as in color balance respectively with respect to the blue, green and red pictures.

What is claimed is:

1. A method of reproducing a color picture, comprising the steps of:
    causing a monochromatic CRT having luminance in a blue, a green and a red region to successively emit light on the basis of a blue signal, a green signal, and a red signal for a scene to successively obtain a blue picture, green picture, and red picture; and
    exposing a color photosensitive material successively to said blue picture, said green picture, and said red picture through a blue filter, a green filter, and a red filter respectively;
    wherein said CRT contains a fluorescent substance with a luminance wavelength distribution in which no peak in the blue luminance region is higher than any peak in the green luminous region and than any peak in the red luminous region.

2. A method of reproducing color picture according to claim 1, wherein said fluorescent substance contained in said CRT contains a mixture of a first fluorescent material having a main luminance distribution in a wavelength region shorter than about 600 nm, and a second fluorescent material having a main luminance distribution in a wavelength region longer than about 600 nm, said first fluorescent material having a lower mixing ratio by weight than said second fluorescent material.

3. A method of reproducing color picture according to claim 1, wherein said fluorescent substance used in said CRT contains a first fluorescent material of (Y.G-d)$O_2$S:Tb and a second fluorescnet material chosen from the group of $Y_2O_3$:Eu and $Y_2O_2S$:Eu, said first and second fluorescent materials being mixed with a weight proportion ranging from 1:3 to 1:5.

4. A method of reproducing color picture, as recited in claim 3, wherein said first fluorescent material is P-45 and said second fluorescent material is P-22.

5. A color reproduction apparatus, comprising:
    a monochromatic CRT having luminance in a blue, a green and a red region;
    a color photosensitive material; and
    a blue, a green and a red filter, each selectively insertable between said CRT and said color photosensitive material;
    wherein said CRT contains a fluorescent substance with a luminance wavelength distribution in which no peak in the blue luminance region is higher than any peak in the green luminous region and than any peak in the red luminous region.

6. A color reproduction apparatus as recited in claim 5, wherein said fluorescent substance contained in said CRT contains a mixture of a first fluorescent material having a main luminance distribution in a wavelength region shorter than about 600 nm, and a second fluorescent material having a main luminance distribution in a wavelength region longer than about 600 nm, said first flourescent material having a lower mixing ratio by weight than said second fluorescent material.

7. A color reproduction apparatus as recited in claim 5, wherein said fluorescent substance used in said CRT contains a first fluorescent material of $(Y.Gd)O_2S:Tb$ and a second fluorescent material chosen from the group of $Y_2O_3:Eu$ and $Y_2O_2S:Eu$, said first and second material being mixed with a weight proportion ranging from 1:3 to 1:5.

8. A color reproduction apparatus as recited in claim 7, wherein said first fluorescent material is P-45 and said second fluorescent material is P-22.

* * * * *